(12) United States Patent
Rosenberg et al.

(10) Patent No.: US 12,118,154 B2
(45) Date of Patent: Oct. 15, 2024

(54) HUMAN-COMPUTER SYSTEM

(71) Applicant: Sensel, Inc., Sunnyvale, CA (US)

(72) Inventors: Ilya Daniel Rosenberg, Sunnyvale, CA (US); Darren Lochun, Sunnyvale, CA (US); Ninad Sathe, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 18/233,029

(22) Filed: Aug. 11, 2023

(65) Prior Publication Data
US 2024/0053831 A1 Feb. 15, 2024

Related U.S. Application Data

(60) Provisional application No. 63/397,242, filed on Aug. 11, 2022.

(51) Int. Cl.
G09G 5/00 (2006.01)
G06F 3/033 (2013.01)

(52) U.S. Cl.
CPC .................... G06F 3/033 (2013.01)

(58) Field of Classification Search
CPC ...... G06F 3/033; G06F 3/0213; G06F 3/0338; A63F 13/20
USPC .................. 345/156, 158, 173, 174
See application file for complete search history.

(56) References Cited

U.S. PATENT DOCUMENTS

| | | |
|---|---|---|
| 7,663,607 B2 | 2/2010 | Hotelling et al. |
| 8,981,242 B2 | 3/2015 | Bayramoglu |
| 9,158,377 B2 | 10/2015 | Shinozaki |
| 9,229,592 B2 | 1/2016 | Bulea et al. |
| 9,454,268 B2 | 9/2016 | Badaye et al. |
| 9,459,736 B2 | 10/2016 | Badaye et al. |
| 9,829,981 B1 | 11/2017 | Ji |
| 9,983,757 B2 | 5/2018 | Porter et al. |
| 10,101,859 B2 | 10/2018 | Jin |
| 10,209,846 B2 | 2/2019 | Wang et al. |
| 10,459,542 B1 | 10/2019 | Costante et al. |
| 10,564,839 B2 | 2/2020 | Rosenberg et al. |

(Continued)

FOREIGN PATENT DOCUMENTS

| | | |
|---|---|---|
| CN | 102007465 A | 4/2011 |
| CN | 102341768 A | 2/2012 |

(Continued)

*Primary Examiner* — Thuy N Pardo
(74) *Attorney, Agent, or Firm* — Run8 Patent Group, LLC; Peter Miller; Alexander Rodriguez

(57) ABSTRACT

One variation of a system for a human-computer interface includes: a substrate; a post; and a controller. The substrate includes: a first region including a drive electrode concentric with a normal axis; and a second region arranged opposite the first region. The second region includes a set of sense electrodes arranged: radially about the normal axis; along a first axis orthogonal to the normal axis; and along a second axis orthogonal to the normal axis and the first axis. The post is arranged over the first region. The controller is configured to: read a set of electrical values from the set of sense electrodes; and based on the set of electrical values, interpret a first displacement of the drive electrode relative the set of sense electrodes along the first axis, and interpret a second displacement of the drive electrode relative to the set of sense electrodes along the second axis.

20 Claims, 6 Drawing Sheets

(56) References Cited

U.S. PATENT DOCUMENTS

| | | |
|---|---|---|
| 10,635,248 B2 | 4/2020 | Hinson et al. |
| 10,963,059 B2 | 3/2021 | Rosenberg et al. |
| 11,422,631 B2 | 8/2022 | Junus et al. |
| 2002/0149561 A1 | 10/2002 | Fukumoto et al. |
| 2005/0038944 A1 | 2/2005 | Harada et al. |
| 2005/0180082 A1 | 8/2005 | Nakamura et al. |
| 2008/0202251 A1 | 8/2008 | Serban et al. |
| 2009/0091548 A1 | 4/2009 | Fujii et al. |
| 2009/0256817 A1 | 10/2009 | Perlin et al. |
| 2010/0156818 A1 | 6/2010 | Burrough et al. |
| 2010/0231530 A1 | 9/2010 | Lin et al. |
| 2010/0253633 A1 | 10/2010 | Nakayama et al. |
| 2011/0025631 A1 | 2/2011 | Han |
| 2012/0029450 A1 | 2/2012 | Grum-Schwensen |
| 2012/0068938 A1 | 3/2012 | Kontio |
| 2012/0068971 A1 | 3/2012 | Pemberton-Pigott |
| 2012/0188194 A1 | 7/2012 | Sulem et al. |
| 2012/0235942 A1 | 9/2012 | Shahoian et al. |
| 2013/0106718 A1 | 5/2013 | Sundara-Rajan |
| 2013/0187742 A1 | 7/2013 | Porter et al. |
| 2013/0264179 A1 | 10/2013 | Ryonai et al. |
| 2014/0002113 A1 | 1/2014 | Schediwy et al. |
| 2014/0008203 A1 | 1/2014 | Nathan et al. |
| 2014/0238152 A1* | 8/2014 | Kallassi ............... G01L 1/146 73/862.626 |
| 2014/0347311 A1 | 11/2014 | Joharapurkar et al. |
| 2015/0050207 A1 | 2/2015 | Dolmatov et al. |
| 2015/0054768 A1 | 2/2015 | Grant et al. |
| 2015/0091858 A1 | 4/2015 | Rosenberg et al. |
| 2015/0145817 A1* | 5/2015 | Chang ................ G06F 3/0446 345/174 |
| 2015/0363019 A1* | 12/2015 | Schediwy ............ G06F 3/0445 345/174 |
| 2016/0070398 A1* | 3/2016 | Worfolk ............... G06F 3/0446 345/174 |
| 2016/0188047 A1* | 6/2016 | Chang .................. G06F 3/047 345/174 |
| 2016/0195931 A1 | 7/2016 | Czelnik et al. |
| 2016/0209441 A1 | 7/2016 | Mazzeo et al. |
| 2016/0259411 A1 | 9/2016 | Yoneoka et al. |
| 2017/0076885 A1 | 3/2017 | Stryker |
| 2017/0285848 A1 | 10/2017 | Rosenberg et al. |
| 2017/0336891 A1 | 11/2017 | Rosenberg et al. |
| 2017/0336904 A1 | 11/2017 | Hsieh et al. |
| 2018/0059791 A1 | 3/2018 | Hajati |
| 2019/0196646 A1 | 6/2019 | Rosenberg et al. |
| 2019/0212842 A1 | 7/2019 | Hinson et al. |
| 2019/0212874 A1 | 7/2019 | Nathan et al. |
| 2019/0265834 A1 | 8/2019 | Rosenberg et al. |
| 2019/0339776 A1 | 11/2019 | Rosenberg et al. |
| 2021/0109615 A1 | 4/2021 | Hu et al. |
| 2021/0333880 A1 | 10/2021 | Junus et al. |
| 2022/0147147 A1* | 5/2022 | Tan ...................... G06F 3/0447 |

FOREIGN PATENT DOCUMENTS

| | | |
|---|---|---|
| CN | 101828161 B | 4/2013 |
| EP | 0469255 A1 | 2/1992 |
| EP | 2375308 A1 | 10/2011 |
| EP | 3043240 A1 | 7/2016 |
| JP | H1185380 A | 3/1999 |
| JP | H11212725 A | 8/1999 |
| JP | 2002149312 A | 5/2002 |
| JP | 2004310518 A | 11/2004 |
| JP | 2007026344 A | 2/2007 |
| JP | 2008192092 A | 8/2008 |
| JP | 2011048409 A | 3/2011 |
| JP | 2011048665 A | 3/2011 |
| JP | 2011209785 A | 10/2011 |
| JP | 2012027875 A | 2/2012 |
| JP | 2012048407 A | 3/2012 |
| JP | 2012181833 A | 9/2012 |
| JP | 2012522317 A | 9/2012 |
| JP | 2015002853 A | 1/2015 |
| JP | 2015125666 A | 7/2015 |
| WO | 2010104953 A1 | 9/2010 |
| WO | 2011111906 A1 | 9/2011 |
| WO | 2012081182 A1 | 6/2012 |
| WO | 2013001779 A1 | 1/2013 |
| WO | 2013104919 A1 | 7/2013 |
| WO | 2013186844 A1 | 12/2013 |
| WO | 2016035628 A1 | 3/2016 |
| WO | 2018112466 A1 | 6/2018 |

\* cited by examiner

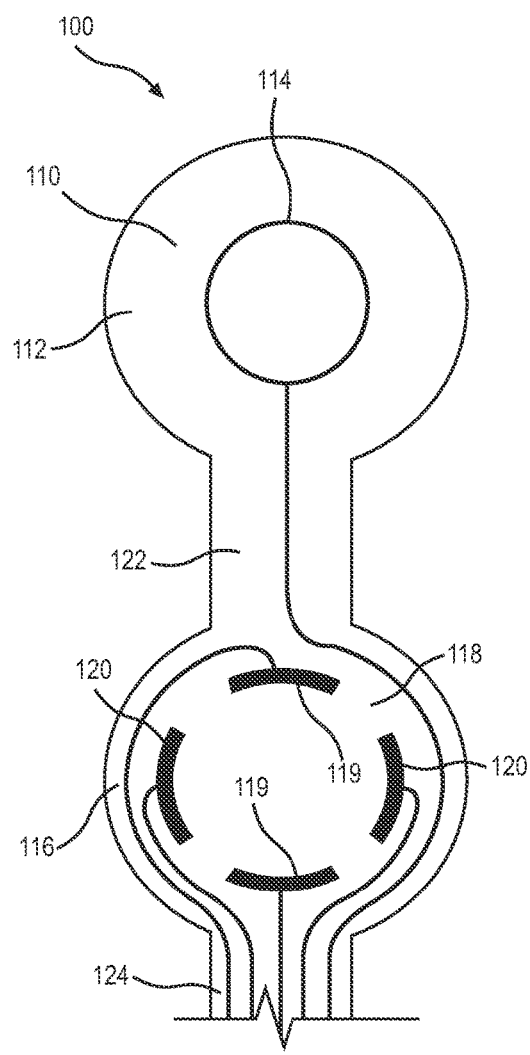
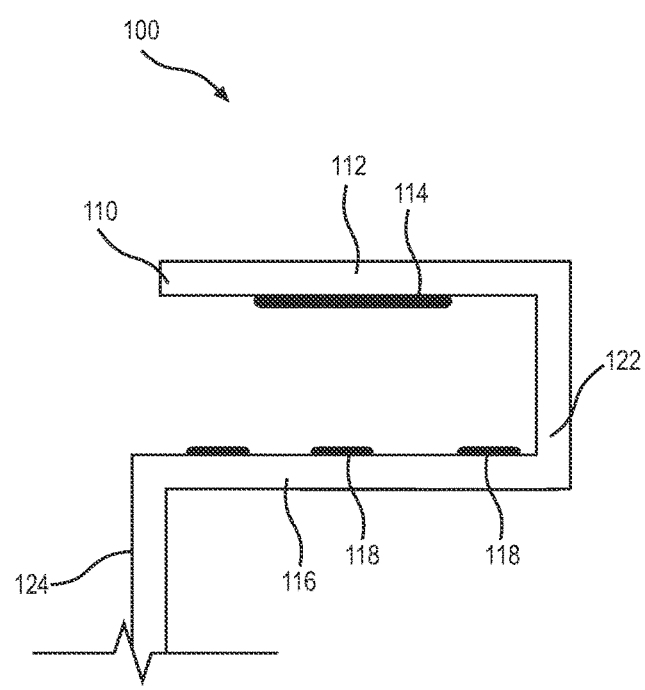
*FIGURE 2A*  *FIGURE 2B*

HUMAN-COMPUTER SYSTEM

CROSS-REFERENCE TO RELATED APPLICATIONS

This application claims the benefit of U.S. Provisional Application No. 63/397,242, filed on 11 Aug. 2022, which is hereby incorporated in its entirety by this reference.

This application is related to U.S. Non-Provisional application Ser. No. 18/082,148, filed on 15 Dec. 2022, and Ser. No. 18/207,603, filed on 8 Jun. 2023, each of which are incorporated in its entirety by this reference.

TECHNICAL FIELD

This invention relates generally to the field of interfaces and more specifically to a new and useful human-computer system in the field of interfaces.

BRIEF DESCRIPTION OF THE FIGURES

FIGS. 2A and 2B are schematic representations of the system.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
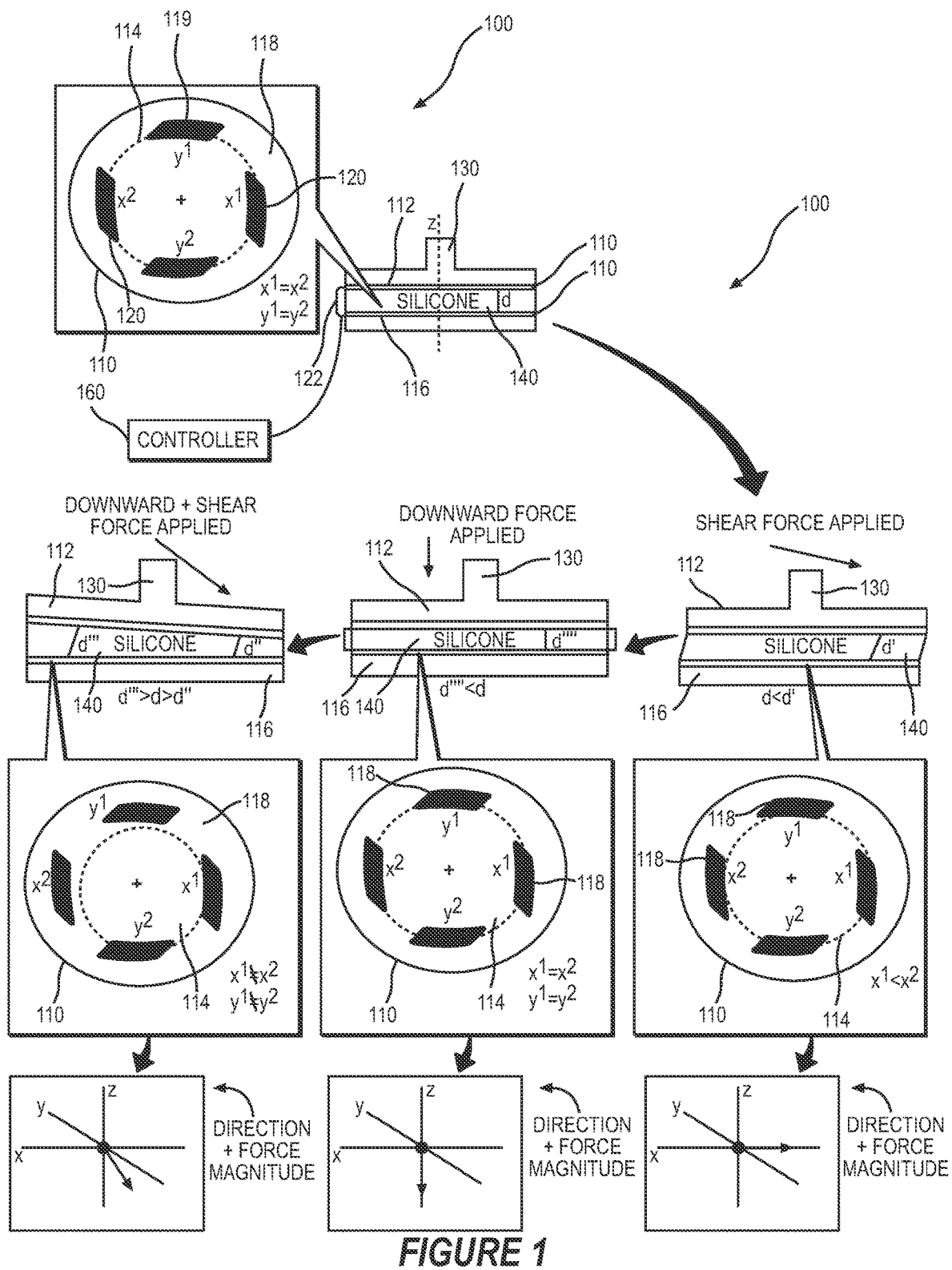
FIG. 1 is a schematic representation of the system.
Figure 3A:
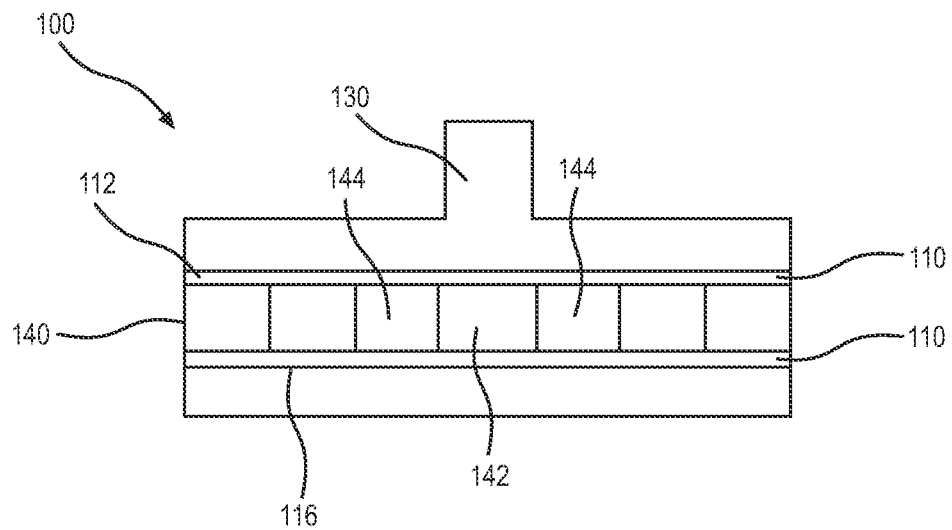
FIGS. 3A and 3B are schematic representations of the system.
Figure 3B:
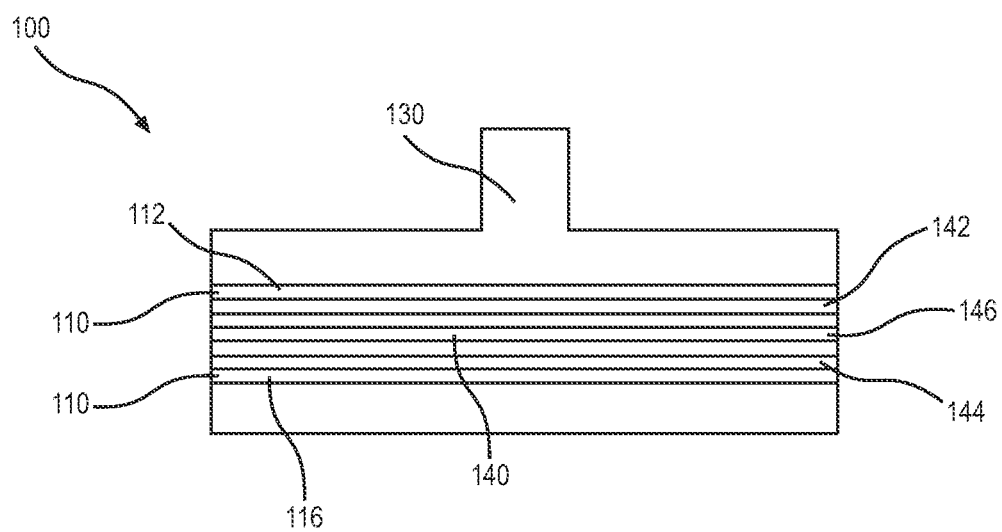
Figure 4:
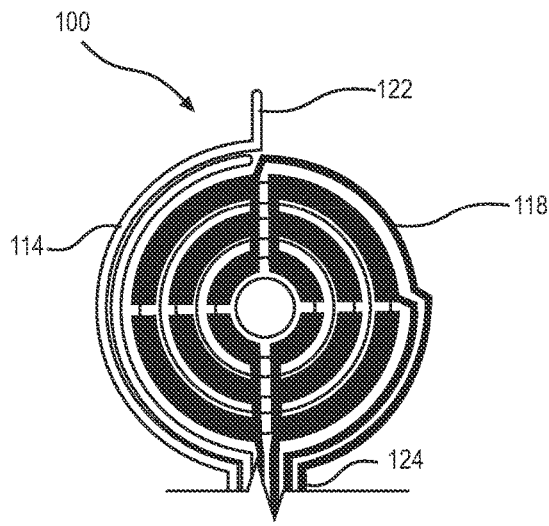
FIG. 4 is a schematic representation of the system.
Figure 5:
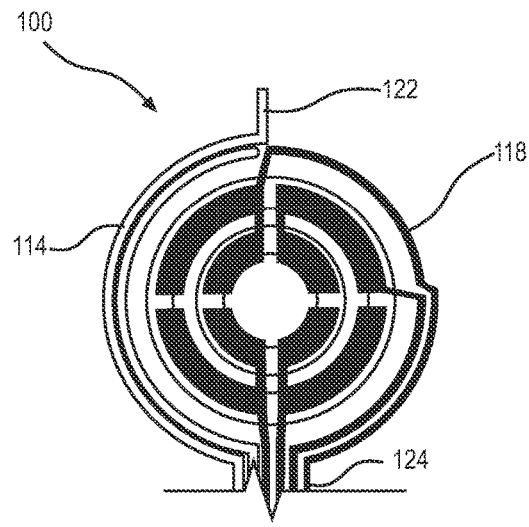
FIG. 5 is a schematic representation of the system.
Figure 6:
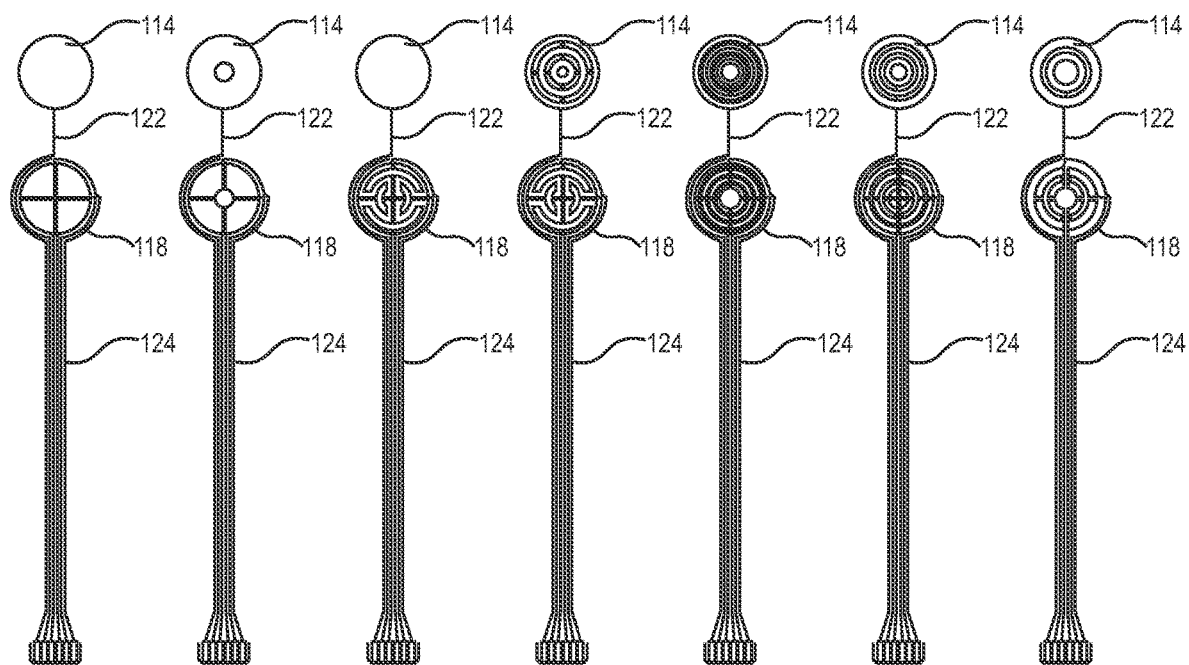
FIG. 6 is a schematic representation of the system.
Figure 7:
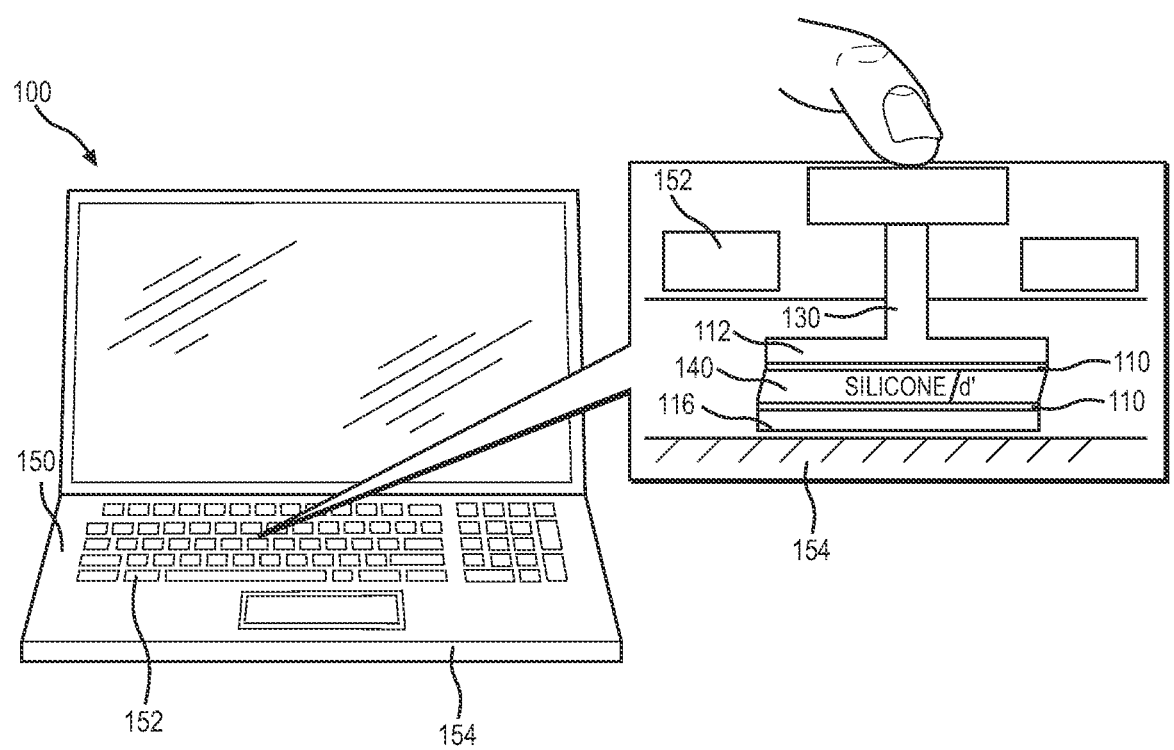
FIG. 7 is a schematic representation of the system.

As shown in FIG. 1, a system 100 for a human-computer interface includes: a substrate 110; a post 130; a separator 140; and a controller 160.

The substrate 110 includes: a first region 112 including a first drive electrode 114 defining an annular geometry concentric with a normal axis; and a second region 116 arranged opposite the first region 112 and including a set of sense electrodes 118. The set of sense electrodes 118 are arranged radially about the normal axis and include: a first subset of sense electrodes 119 offset from the normal axis and arranged along a first axis orthogonal to the normal axis; and a second subset of sense electrodes 120 offset from the normal axis and arranged along a second axis orthogonal to the normal axis and the first axis.

The post 130 is arranged over the first region 112 of the substrate 110.

The separator 140 is: interposed between the first region 112 of the substrate 110 and the second region 116 of the substrate 110; configured to deflect along the first axis and the second axis responsive to shear forces applied to the post 130; and configured to locally compress, along the normal axis, responsive to downward forces applied to the post 130.

The controller 160 is configured to read a set of electrical values from the set of sense electrodes 118 and, based on the set of electrical values: interpret a first displacement of the first drive electrode 114 relative to the first subset of sense electrodes 119, in the set of sense electrodes 118, along the first axis; interpret a second displacement of the first drive electrode 114 relative to the second subset of sense electrodes 120, in the set of sense electrodes 118, along the second axis; and interpret a third displacement of the first drive electrode 114 relative the set of sense electrodes 118 along the normal axis. The controller 160 is also configured to: interpret a direction of an input applied to the post 130 based on the first displacement and the second displacement; and interpret a force magnitude of the input based on the first displacement, the second displacement, and the third displacement.

One variation of the system 100 for a human-computer interface includes the controller 160 configured to interpret the force magnitude by: interpreting a first force magnitude component of the input, parallel to the first axis, applied to the post 130 based on the first displacement; interpreting a second force magnitude component of the input, parallel to the second axis, applied to the post 130 based on the second displacement; and interpreting a third force magnitude component of the input, parallel to the normal axis, applied to the post 130 based on the third displacement.

2. Applications

Generally, the system 100 functions as a human-computer interface device (e.g., a pointing device, joystick device, gaming controller 160 that detects inputs by a (human) user, transforms these inputs into machine-readable commands, and communicates these commands to a computing device.

In one example, the system 100 can define a handheld computer pointing device (or "mouse"): integrated between keyboard keys of a computing device; and configured to detect and output cursor events and click events to the computing device in response to compressive and shear inputs on a post 130 of the system 100 that laterally displaces the sense electrodes relative to the drive electrode. In particular, the controller 160 can: drive the drive electrode to target voltage or voltage profile; read an electrical (e.g., capacitance) value from each sense electrode; interpret changes in effective distance between each sense electrode and the drive electrode based on corresponding changes in electrical value; and combine (or "fuse") these changes in effective distance of multiple sense electrodes into a three-dimensional input on the post 130, including a compressive force, lateral shear force, and longitudinal shear force on the post 130.

In this example, the system 100 can be located between the "G," "H," and "B" keys of a QWERTY keyboard, and the post 130 extend upwardly from the keyboard, such as terminating at a height one millimeter above the adjacent G," "H," and "B" keys.

In particular, the system 100 includes a substrate 110 defining a unitary structure including: a first region 112 including a drive electrode defining an annular geometry across the first region 112; a second region 116 including a set of sense electrodes 118; and a connector 122 extending between the first region 112 and the second region 116. The substrate 110 is then folded across the connector 122 to locate: the first region 112 over the second region 116; and the set of sense electrodes 118 concentrically aligned and radially offset the drive electrode. The substrate 110 can further include traces: arranged across the connector 122 and a tail 124 extending from the second region 116; and electrically coupling the drive electrode, the set of sense electrodes 118, and the controller 160. The controller 160 can then: serially drive the drive electrode across the first region 112 of the substrate 110 to induce capacitive coupling to the set of sense electrodes 118 across the second region 116 of the substrate 110; and define baseline electrical values for the concentrically aligned drive electrode and set of sense electrodes 118. In this example, the tail 124 of the substrate 110 can be connected to an existing controller 160 integrated into a PCBA within the computing device, such as a controller 160 coupled to a touchpad interface integrated on the computing device. Therefore, the system 100 can include a single controller 160 for: driving electrodes across the substrate 110 of the pointing device integrated on the computing device; and driving electrodes across the touchpad interface integrated on the computing device thereby reducing cost and weight for the system 100.

The system 100 further includes a separator 140: formed of a compressible material (e.g., silicone); arranged between the first region 112 and the second region 116 of the substrate 110; and thereby enabling lateral and/or vertical displacement of the first region 112 relative the second region 116 of the substrate 110 responsive to lateral and/or vertical force applied to the post 130 arranged over the first region 112 of the substrate 110. As a result, during application of a lateral force (e.g., shear force) to the post 130 arranged over the first region 112 of the substrate 110, the drive electrode arranged across the first region 112 of the substrate 110 is then concentrically misaligned to the set of sense electrodes 118 arranged across the second region 116, thereby affecting capacitance values between the drive electrode and the set of sense electrodes 118 of the substrate 110.

The controller 160 can then execute a scan cycle to: read a set of electrical values from a first subset of sense electrodes 119 defining a first axis (e.g., x-horizontal axis) of the substrate 110; and interpret a first displacement of an input applied to the post 130 over the first region 112 of the substrate 110—along this first axis—based on deviations of electrical values from baseline electrical values for this first subset of sense electrodes 119 along the first axis. Similarly, during the scan cycle, the controller 160 can: read a second set of electrical values from a second subset of sense electrodes 120 defining a second axis (e.g., y-horizontal axis) of the substrate 110; and interpret a second displacement of the input applied to the post 130—along this second axis—based on deviations of electrical values from baseline electrical values for this second subset of sense electrodes 120 along the second axis. Additionally or alternatively, the controller 160 can, during the scan cycle: fuse the first set of electrical values and the second set of electrical values; and interpret a third displacement (e.g., downward displacement) of the input based on the fused set of electrical values. The system 100 can thus: interpret a direction of an input applied to the post 130 based on the first displacement and the second displacement; and interpret a force magnitude of the input applied to the post 130 based on the first displacement, second displacement, and third displacement.

Therefore, the system 100 can generate a touch image based on lateral and/or vertical displacements of the drive electrode relative the set of sense electrodes 118 and output this touch image corresponding to: cursor events based on lateral displacement of the drive electrode relative the set of sense electrodes 118; and click events based on vertical displacement of the drive electrode relative the set of sense electrodes 118.

3. Keyboard Integration

In one implementation, the system 100 is integrated into a keyboard 150 of a computing device and includes a set of keys 152; a chassis 154; and a controller 160. In this implementation, the set of keys 152 are arranged over the chassis 154. Additionally, the system 100: is arranged within the chassis 154; and located centrally within the set of keys 152 arranged on the chassis 154. Furthermore, the substrate 110 of the system 100 can be connected to an external controller 160 arranged within the chassis 154 of the keyboard 150. In this implementation, the system 100 can also include: a touch pad arranged at the chassis 154 proximal the keyboard 150; and the controller 160 arranged within the chassis coupled to the touch pad and the substrate 110 arranged below the post 130. Thus, the system 100 can: interpret touch inputs applied to the touch pad based on electrical values read by the controller 160 from the touch pad; and interpret touch inputs applied to the post based on electrical values read from the set of sense electrodes 118 on the second region 116 of the substrate no.

For example, the system 100 can include a set of plates (e.g., a lower plate and an upper plate) arranged within the chassis 154 of the keyboard 150. In this example, the lower plate: is arranged within the chassis 154; is supported (e.g., bonded) to an existing PCBA arranged in the chassis 154 and coupled to the set of keys 152 of the keyboard 150; and defines a second horizontal plane for the system 100. Furthermore, the upper plate is arranged over the lower plate defining a target height and defines a first horizontal plane for the system 100 parallel to the second horizontal plane.

In this example, the first region 112 of the substrate 110 is arranged (e.g., bonded) across a bottom side of the upper plate and the second region 116 of the substrate no is arranged (e.g., bonded) across a top side of the upper plate. Furthermore, the post 130 extends orthogonally from a top side of the upper plate defining a vertical axis (e.g., z-axis, height axis). The system 100 can further include a nub and/or nipple coupled to the post 130 and configured to receive a finger of a user.

Therefore, the system 100 can: detect lateral displacement of the first horizontal plane of the upper plate relative the second horizontal plane of the lower plate responsive to shear forces applied—by a user—to the nub of the post 130; detect vertical displacement of the upper plate toward the lower plate responsive to downward forces applied—by the user—to the nub of the upper plate; and then transform these vertical and horizontal displacements into a cursor event (e.g., cursor direction input, click input, double click input) configured to modify a position of a cursor within a graphical user interface on a computing device connected to the keyboard 150.

In yet another example, the system 100 can: interpret a direction for an input applied to the post based on electrical values read from the set of sense electrodes 118 at the substrate 110; interpret a force magnitude of the input based on the electrical values; transform the direction and the force magnitude of the input into an input velocity corresponding to a cursor at the graphical user interface. In yet another example, the system 100 can: interpret a first click event for a cursor at the graphical user interface in response to the force magnitude of the input exceeding a threshold force magnitude; and in response to application of the force magnitude exceeding a target time window, interpret a second click event, such as a hold function, for the cursor at the graphical user interface. In yet another example, the system 100 can: interpret a first click event for a cursor arranged over a graphic item at the graphical user interface in response to the force magnitude of the input exceeding the threshold force magnitude; and drag the item across the graphical user interface based on the direction interpreted for the input.

Figure 8:
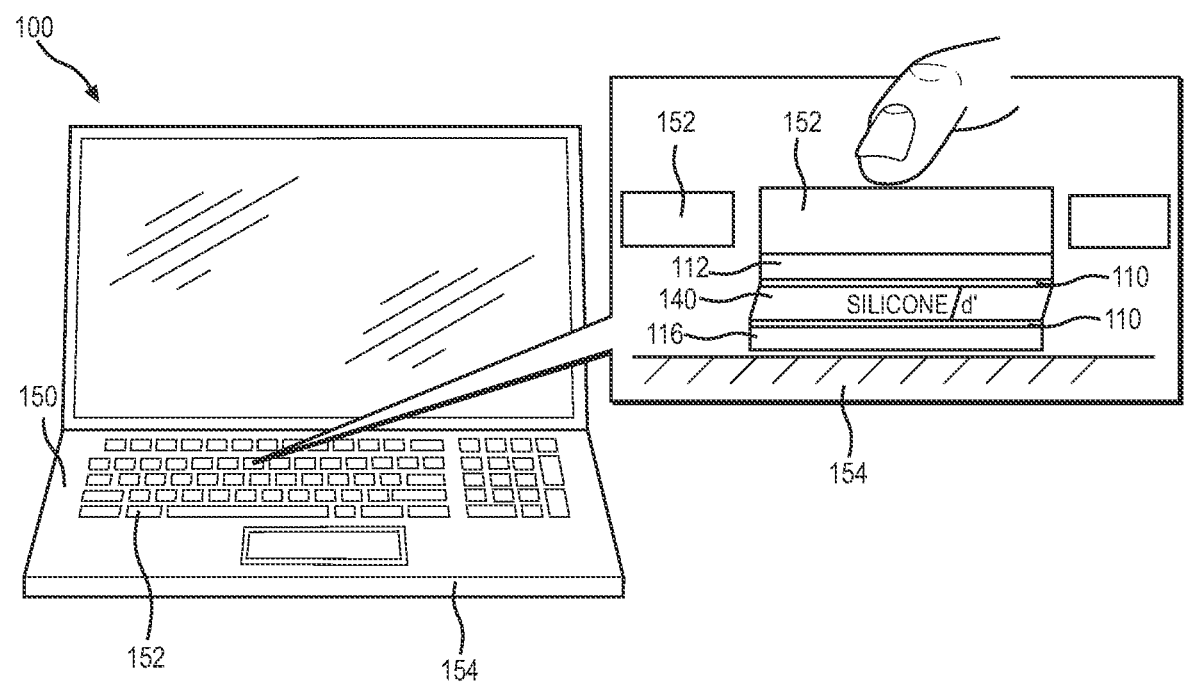
FIG. 8 is a schematic representation of the system.
Figure 9:
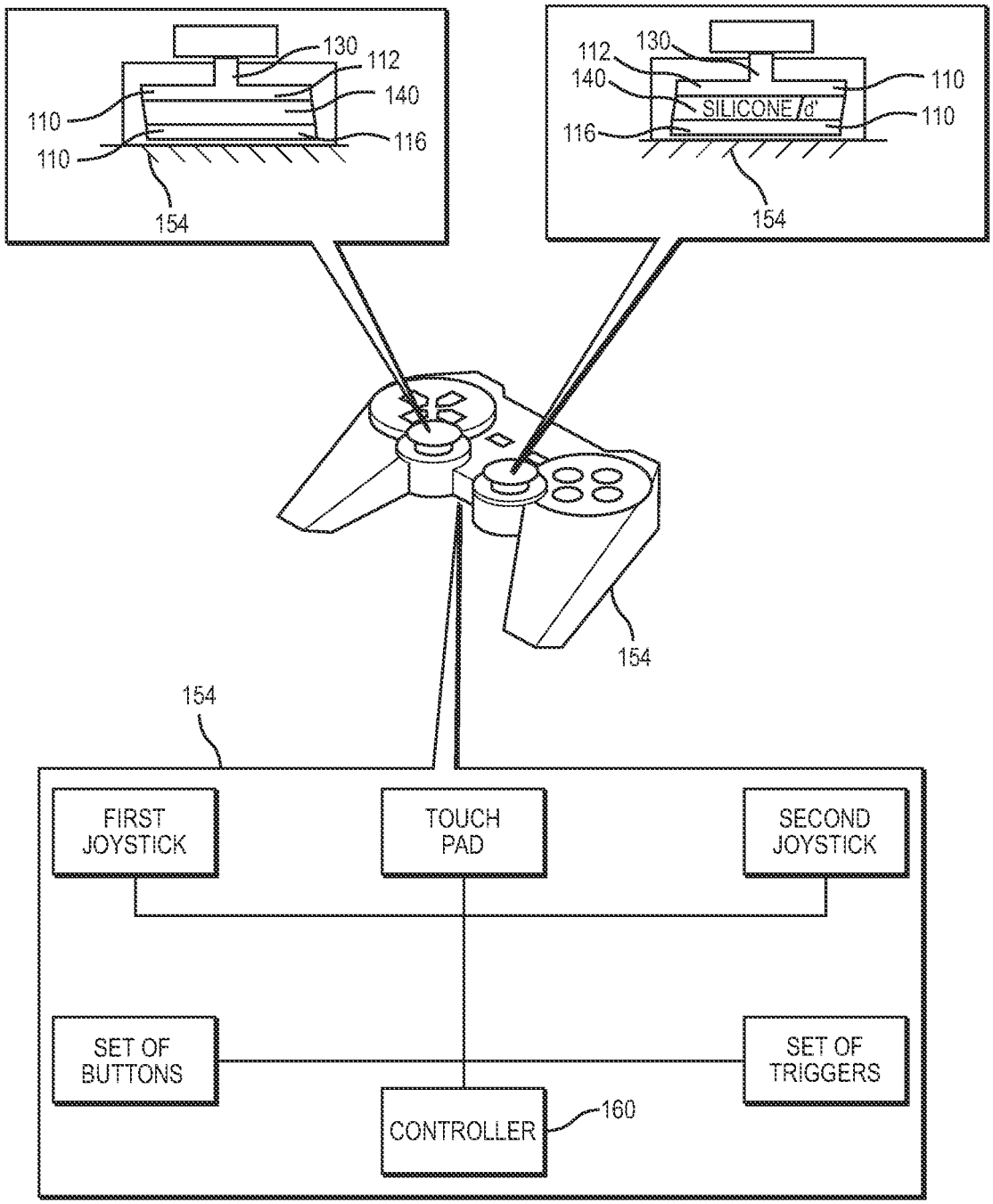
FIG. 9 is a schematic representation of the system.

In yet another example, as shown in FIG. 8, the system 100 includes: a first key (e.g., "return" key, "D" key) in the set of keys arranged over the first region 112 of the substrate 110; and the substrate coupled to a controller 160 located internally within the chassis 154. Thus, the system can: read a set of electrical values from the set of sense electrodes 118 on the substrate 110 arranged below the first key; interpret a first direction and a first force magnitude for a first input applied to the first key; and output a first keystroke associated with the first key in response to the first direction corresponding to a downward direction and the first force magnitude exceeding a threshold force magnitude. The system can then: implement this structure for each key, in the set of keys, across the chassis; and interpret directions and force magnitudes for inputs applied across the set of keys; output keystrokes responsive to local compressions and deflections at each key, in the set of keys.

3.1 Example: Joystick Integration

In another example, the system 100 is integrated into a joystick: configured to connect (e.g., wirelessly) to a computing device; and including a chassis 154 configured to locate a set of buttons, a set of triggers, and a set of joysticks. In this example, the substrate 110 is arranged within a chassis 154 and below a first joystick, in the set of joysticks. Accordingly, the post 130 is integrated within the first joystick at the chassis 154 such that the first region 112 of the substrate 110 shears relative to the second region 116 of the substrate 110 responsive to application of an input on the first joystick. Accordingly, the system 100 can then: read a set of electrical values from the set of sense electrodes 118 across the second region 116; interpret a magnitude and direction of an input applied to the first joystick based on the first set of electrical values; and transform the magnitude and direction of the input into a cursor vector configured to modify a position of a cursor within a graphical user interface on a computer device connected to the joystick. In this example, the set of joysticks: includes the first joystick and a second joystick arranged at the chassis; and coupled to a controller 160 located internally within the chassis. Thus, the controller can: interpret a first direction and first force magnitude for a first input applied to the first joystick; transform the first direction and first force magnitude into a first joystick event (e.g., joystick click, directional input); interpret a second direction and a second force magnitude for a second input applied to the second joystick; and transform the second direction and the second force magnitude into a second joystick event (e.g., joystick click, directional input). The system can then output the first joystick event and the second joystick event to a computing device (e.g., game console) connected to the controller.

4. Substrate

In one implementation, the system 100 includes a substrate 110 defining a unitary structure formed of a single printed flex layer bonded across a PET layer and including: a first region 112 including a first drive electrode 114; and a second region 116 including a set of sense electrodes 118. The first region 112 is arranged (e.g., folded) over the second region 116 of the substrate 110 in order to: locate the first drive electrode 114 in concentric alignment with the set of sense electrodes 118; and form a capacitive force sensor below the post 130 of the system 100. In this implementation, the system 100 can interchangeably integrate the first drive electrode 114 and set of sense electrodes 118 across the first region 112 and the second region 116, such as by including: the first region 112 including the set of sense electrodes 118; and the second region 116 including the first drive electrode 114.

In one example, the substrate 110 can include: a first region 112 (e.g., a first circular region of the printed flex); a second region 116 (e.g., a second circular region of the printed flex); a connector 122 extending between the first region 112 and the second region 116 of the substrate 110; and a tail 124 extending from the second region 116 of the substrate no. In this example, the first region 112 includes a first drive electrode 114 (e.g., drive electrode trace) formed (e.g., printed) on the first region 112 to form an annular geometry defining an inner diameter and an outer diameter across the first region 112 of the substrate no. The second region 116: is folded across the connector 122 to locate the first region 112 over the second region 116; and includes a set of sense electrodes 118 (e.g., sense electrode traces) concentrically aligned to the first drive electrode 114 of the first region 112 such that the set of sense electrodes 118 define a first axis (e.g., x-horizontal axis) and a second axis (e.g., y-horizontal axis) of a horizontal plane when the first region 112 is arranged over the second region 116.

In the aforementioned example, the substrate 110 can include a second region 116 including a set of sense electrodes 118 including a first subset of sense electrodes 119 and a second subset of sense electrodes 120 defining arcs concentrically aligned to the first drive electrode 114 when the substrate 110 is folded across the connector 122. The first subset of sense electrodes 119 includes a first sensor electrode arc: spanning a particular arc length concentrically aligned with the first drive electrode 114; and offset a target distance from the outer diameter of the first drive electrode 114. Additionally, the first subset of sense electrodes 119 includes a second sensor electrode arc: spanning the particular arc length concentrically aligned with the first drive electrode 114; offset the target distance from the outer diameter of the first drive electrode 14; and arranged opposite the first sensor electrode arc to define the first axis (e.g., x-horizontal axis) of the substrate 110.

Similarly, the second subset of sense electrodes 120 can include a third sensor electrode arc: spanning the particular arc length concentrically aligned with the first drive electrode 114; offset the target distance from the outer diameter of the first drive electrode 14; and arranged angularly offset (e.g., 90 degrees) from the first sensor electrode arc and the second sensor electrode arc. Additionally, the second subset of sense electrodes 120 can include a fourth sensor electrode arc: spanning the particular arc length concentrically aligned with the first drive electrode 14; offset the target distance from the outer diameter of the first drive electrode 114; and arranged opposite the third sensor electrode arc to define the second axis (e.g., y-horizontal axis) of the substrate 110. The substrate 110 further includes traces arranged across the connector 122 and the tail 124 electrically coupled to the first drive electrode 114 and the set of sense electrodes 118. The second region 116 of the substrate 110 can be coupled to the first region 112 of the substrate 110 via the connector 122 (e.g., flex connector 122) and then connected to the controller 160 via the tail 124.

As a result, during application of a shear force to the post 130, the first region 112 including the first drive electrode 114 is shifted laterally relative the horizontal plane of the second region 116 of the substrate 110, thereby concentrically misaligning the first drive electrode 114 and the set of sense electrodes 118 and affecting capacitance values between the first drive electrode 114 and the second set of drive electrodes. Therefore, the system 100 can then: drive the first drive electrode 114 from the traces arranged across the tail 124 of the substrate 110; serially read electrical values (e.g., voltage, capacitance rise time, capacitance fall time, resonant frequency)—representing capacitive coupling between the first drive electrode 114 and the set of sense electrodes 118—from the traces across the tail 124 connected to the set of sense electrodes 118; and interpret lateral displacement along each of the first axis (e.g., x-horizontal axis) and the second axis (e.g., y-horizontal axis) of the substrate 110 based on deviation of electrical values— read from the first subset of sense electrodes 119 and the second subset of sense electrodes 120—from baseline capacitance-based electrical values stored for the first subset of sense electrodes 119 and the second subset of sense electrodes 120.

In one variation, the system 100 can implement: a sense electrode (e.g., with the structure described above for the drive electrode) across the first region 112 of the substrate 110; and a set of drive electrodes (e.g., with the structure described above for the set of sense electrodes) across the second region 116 of the substrate 110. For example, the system 100 can include a substrate 110 including: a first set of drive electrodes including the first drive electrode 114 and a second drive electrode; and the set of sense electrodes 118 concentrically aligned with the first set of drive electrodes and aligned offset the first drive electrode 114 and the second drive electrode. In this variation, the first drive electrode 114 and the second drive electrode form an annular geometry arranged on the first region 112 of the substrate 110 and defines a first axis for the system 100. Therefore, the system 100 can: serially drive the set of drive electrodes; read electrical values from the sense electrode; and detect lateral and vertical displacement of the first region 112 including the sense electrode relative to the second region including the set of drive electrodes.

4.1 Dual Substrate

In another implementation, the system 100 can include: an upper substrate 110; a lower substrate 110 arranged below the upper substrate 110; a connector 122 (e.g., flex connector 122) coupling the upper substrate 110 and the lower substrate 110; and a tail 124 extending from the lower substrate 110 and connected to the controller 160. In this implementation the upper substrate 110 and the lower substrate 110 can be formed of a rigid and/or flexible PCBA layer. The upper substrate 110 includes the first drive electrode 114 arranged (e.g., etched) across a bottom side of the upper substrate 110. The lower substrate 110 includes the set of sense electrodes 118 arranged (e.g., etched) across a top side of the lower substrate 110. Therefore, the system 100 can include an upper substrate 110 and a lower substrate 110 to rigidly support the post 130 arranged over the substrate 110 opposite the first drive electrode 114.

4.2 Concentric Sense electrodes

In one implementation, the system 100 can include a substrate 110 including: a first region 112 including a first set of drive electrodes, each concentrically arranged on the first region 112; and a second region 116 arranged parallel the first region 112 and including a set of sense electrodes 118. Each sensor electrode in the set of sense electrodes 118: is concentrically aligned with first set of drive electrodes on the first region 112; is radially offset by a target distance relative the set of drive electrodes; and partially overlaps (i.e., faces) the first set of drive electrodes arranged on the first region 112 when the first region 112 is folded over the second region 116.

In this implementation, the set of sense electrodes 118 can include a first subset of sense electrodes 119 and a second subset of sense electrodes 120 arranged across the first region 112 of the substrate 110. The first subset of sense electrodes 119 can include: a first sense electrode defining a first arc concentric with the normal axis and arranged in a first direction along the first axis; and a second electrode defining a second arc concentric with the normal axis and arranged in a second direction, opposite the first direction, along the first axis. Furthermore, the second subset of sense electrodes 120 can include: a third sense electrode defining a third arc concentric with the normal axis and arranged in a third direction, orthogonal the first direction and the second direction, along the second axis; and a fourth sense electrode defining a fourth arc concentric with the normal axis and arranged in a fourth direction—opposite the third direction—arranged orthogonal the first direction and the second direction. Thus, the fourth sense electrode cooperates with the third sense electrode, the second sense electrode, and the first sense electrode to define an annular geometry for the set of sense electrodes 118 concentric with the normal axis.

Accordingly, the system 100 can then interpret the first displacement of the first drive electrode 114 relative the first subset of sense electrodes 119 along the first axis by: calculating a first difference between a first electrical value (i.e., from the first sense electrode) and a second electrical value (i.e., from the second sense electrode) in the set of electrical values; and interpreting the first displacement of the first drive electrode 114 relative to the first subset of sense electrodes 119—in the set of sense electrodes 118— along the first axis based on the first difference. Furthermore, the system 100 can also interpret the second displacement of the second drive electrode relative the second subset of sense electrodes 120 along the second axis by: calculating a second difference between a third electrical value (i.e., from the third sense electrode) and a fourth electrical value (i.e., from the fourth sense electrode) in the set of electrical values; and interpreting the second displacement of the first drive electrode 114 relative to the second subset of sense electrodes 120—in the set of sense electrodes 118—along the second axis based on the second difference.

In one example, the first region 112 of the substrate 110 includes a first set of drive electrodes including a first drive electrode 114 and a second drive electrode. The first drive electrode 14: defines a first radial distance about the first region 112; and is arranged about a center of the first region 112. The second drive electrode: defines a second radial distance greater than the first radial distance; and is arranged about the center of the first region 112. Furthermore, the second region 116 of the substrate no includes a set of sense electrodes 118 including a first subset of sense electrodes 119 and a second subset of sense electrodes 120. The first subset of sense electrodes 119 can include a first sensor electrode arc, a second sensor electrode arc, a third sensor electrode arc, and a fourth sensor electrode arc, and each sensor electrode arc in the first subset of sense electrodes 119: encircling the first drive electrode 14; concentrically aligned with the center of the first region 112; overlapping the first drive electrode 14; and offset a third radial distance, greater than the first radial distance of the first drive electrode 114 and less than the second radial distance of the second drive electrode. Additionally, the second subset of sense electrodes 120 can include a fifth sensor electrode arc, a sixth sensor electrode arc, a seventh sensor electrode arc, and an eighth sensor electrode arc, and each sensor electrode arc in the second subset of sense electrodes 120: encircling the second drive electrode; concentrically aligned with the center of the first region 112; overlapping the second drive electrode; and offset a fourth radial distance greater than the second radial distance of the second drive electrode.

Therefore, the system 100 can: serially read electrical values from a substrate 110 including first concentric drive and sense electrode pairs and second concentric drive and sense electrode pairs; and interpret lateral and vertical displacement of the first region 112 relative the second region 116 of the substrate 110 based on deviations of electrical values from baseline electrical values for the first concentric drive and sense electrode pairs and the second concentric drive and sense electrode pairs.

In another example, the first subset of sense electrodes 119 can include a first sensor electrode arc, a second sensor electrode arc, a third sensor electrode arc, and a fourth sensor electrode arc, and each sensor electrode arc in the first subset of sense electrodes 119: facing the first drive electrode 14; and concentrically aligned with the center of the first region 112 to define an inner ring of drive and sense electrode pairs. In this example, the second subset of sense electrodes 120 include a fifth sensor electrode arc, a sixth sensor electrode arc, a seventh sensor electrode arc, and an eighth sensor electrode arc, and each sensor electrode arc in the second subset of sense electrodes 120: encircling the second drive electrode; and concentrically aligned with the center of the first region 112 defining an outer ring of drive and sense electrode pairs.

Therefore, the system 100 can: serially read a first set of electrical values from the inner ring of the drive and sense electrode pairs; interpret a vertical displacement of the first region 112 toward the second region 116 based on the first set of electrical values; serially read a second set of electrical values from the outer ring of drive and sense electrode pairs; and interpret lateral displacement of the first region 112 relative the second region 116 based on the second set of electrical values.

5. Separator

Generally, the system 100 includes the separator 140: interposed between the first region 112 and the second region 116 of the substrate 110; and vertically supporting the first region 112 of the substrate 110 over the second region 116.

In one implementation, the separator 140: is bonded to a bottom face of the first region 112 of the substrate 110 and a top face of the second region 116 of the substrate 110; and is formed of a compressible material (e.g., silicone) that deflects laterally (or "shears") and vertically to enable the first region 112 of the substrate 110 to translate laterally and vertically responsive to shear forces and downward forces applied to the post 130 arranged over the substrate 110. In this implementation, the separator 140 spans a target area between the first region 112 and the second region 116 of the substrate 110 substantially equal to an area of the first region 112 and the second region 116.

Therefore, the system 100 can, responsive to application of a shear force and/or downward force to the post 130 arranged over the substrate 110: interpret lateral and/or vertical displacement of the first region 112 relative the second region 116 of the substrate 110 based on changes of electrical values between the first drive electrode 114 and the set of sense electrodes 118; and transform these displacements into one of various commands for a computing device.

5.1. Separator: Durometer Gradient

In another implementation, the system 100 can include the separator 140 including a set of layers: interposed between the first region 112 and the second region 116 of the substrate 110; and each separator 140 layer formed of a compressible material (e.g., silicon) within a target durometer range (e.g., 35A-45A) in order to increase sensitivity of shear and/or downward forces applied to the post 130 arranged over the first region 112 of the substrate 110.

In one implementation, the separator 140 includes a set of layers arranged in a concentric annular configuration interposed between the first region 112 and the second region 116 of the substrate 110. In this implementation, the separator 140 includes a first separator layer 142: interposed between the first region 112 and the second region 116 of the substrate 110; defining a cylindrical geometry concentric with the normal axis; and characteristic of a first durometer. Additionally, the separator 140 includes a second separator layer 144: defining an annular geometry concentric with the normal axis; arranged about the cylindrical geometry of the first separator layer 142 interposed between the first region 112 and the second region 116 of the substrate 110; and characteristic of a second durometer less than the first durometer. Thus, the second separator layer 144 cooperates with the first separator layer 142 to: deflect along the first axis and the second axis responsive to shear forces applied to the post 130; and locally compress, along the normal axis, responsive to downward forces applied to the post 130.

In one example, the separator 140 can include a set of layers including a first separator layer 142 and a second separator layer 144. In this example, the first separator layer 142: is formed of a first material of a first durometer (e.g., 40A); is interposed between the first region 112 and the second region 116 of the substrate 110; and spans a first region 112 between the first region 112 and the second region 116 of the substrate 110 substantially equal to a circular area of the first drive electrode 114 arranged across the first region 112 of the substrate 110. Additionally, the second separator layer 144: is formed of a second material of a second durometer less than the first durometer (e.g., 35A); is interposed between the first region 112 and the second region 116 of the substrate 110; and encircles the first separator layer 142 toward a perimeter edge of the substrate 110.

In another implementation, the separator 140 includes a set of layers arranged in a horizontally stacked configuration interposed between the first region 112 and the second region 116 of the substrate 110. In this implementation, the separator 140 includes a first separator layer 142: arranged over the first drive electrode 114 on the first region 112 of the substrate 110; and characteristic of a first durometer. The separator 140 also includes a second separator layer 144: arranged over the set of sense electrodes 118 on the second region 116 of the substrate 110 opposite the first separator layer 142 on the first region 112 of the substrate 110; and characteristic of the first durometer. Additionally, the separator 140 includes a third separator layer 146: interposed between the first separator layer 142 and the second separator layer 144; and characteristic of a second durometer less than the first durometer. Thus, the third separator layer 146 cooperates with the second separator layer 144 and the first separator layer 142 to: deflect along the first axis and the second axis responsive to shear forces applied to the post 130; and locally compress, along the normal axis, responsive to downward forces applied to the post 130.

In another example, the separator 140 can include a set of layers including a first separator layer 142, a second separator layer 144, a third separator layer 146 and a fourth separator 140 layer. In this example, the first separator layer 142 and the second separator layer 144 are each formed of a first material of a first durometer (e.g., 40A). The first separator layer 142 is arranged across a bottom side of the first region 112 of the substrate 110. The second separator layer 144 is arranged across a top side of the second region 116 of the substrate no. Furthermore, the third separator layer 146 and the second separator layer 144 are each formed of a second material of a second durometer less than the first durometer (e.g., 35A). The third separator layer 146 is arranged across a bottom side of the first separator layer 142 arranged below the first region 112 of the substrate no. The fourth separator 140 layer is arranged across a top side of the second separator layer 144 arranged over the second region 116 of the substrate no.

6.0 Gestures

Generally, the system 100 can transform an input detected on the post 130 arranged over the first region 112 of the substrate 110 onto one of various commands, such as based on lateral displacement, vertical displacement, and/or a combination of lateral and vertical displacement of the substrate 110 layers.

6.1 Lateral Gestures

In one implementation, the system 100 can: detect lateral displacement of the first region 112 of the substrate 110—responsive to shear forces applied by a user to the post 130 arranged over the first region 112 of the substrate 110—along a first axis (e.g., x-horizontal axis) and a second axis (e.g., y-horizontal) axis of the substrate 110; and transform the detected displacements into movements of a pointer for a graphical user interface on a computing device.

For example, the system 100 can, during a scan cycle: read a first set of electrical values from the first subset of sense electrodes 119 on the second region 116 of the substrate 110 defining the first axis (e.g., x-horizontal axis) of the substrate 110; and interpret a magnitude and direction of a first input along the first axis based on magnitudes of deviations of electrical values from baseline electrical values across the first subset of sense electrodes 119. In this example, the system 100 can: read a first electrical value from the first sensor electrode arc in the first subset of sense electrodes 119; read a second electrical value from the second sensor electrode arc—arranged opposite the first sensor electrode arc—in the first subset of sense electrodes 119; and interpret a lateral displacement along a first direction on the first axis in response to detecting a first increase of electrical value—from a first baseline electrical value—for the first sensor electrode arc and detecting a second decrease of electrical value—from a second baseline electrical value—for the second sensor electrode arc. Alternatively, the system 100 can: interpret a lateral displacement along a second direction—opposite the first direction—on the first axis in response to detecting a first decrease of electrical value—from a first baseline electrical value—for the first sensor electrode arc and detecting a second increase of electrical value—from a second baseline electrical value—for the second sensor electrode arc.

Furthermore, the system 100 can interpret a force magnitude along the first axis based on deviations of a difference in electrical values between the first electrical value and the second electrical value from a baseline difference in electrical values between the first electrical value and the second electrical value. The system 100 can then: generate a first axis container; and store a first axis direction and a first axis force magnitude of the first input in the first axis container.

Similarly, the system 100 can, during the scan cycle: read a second set of electrical values from the second subset of sense electrodes 120 on the second region 116 of the substrate 110 defining the second axis (e.g., y-horizontal axis) of the substrate 110; and interpret a magnitude and direction of the first input along the second axis based on magnitudes of deviations of electrical values from baseline electrical values across the second subset of sense electrodes 120. The system 100 can: read a third electrical value from the third sensor electrode arc; read a fourth electrical value from the fourth sensor electrode arc; interpret a lateral displacement along a particular direction on the second axis based on deviations of the third electrical value and the second electrical value from a third baseline electrical value and a fourth baseline electrical value; and interpret a force magnitude along the second axis based on deviations of a difference in electrical values between the third electrical value and the fourth electrical value from a baseline difference in electrical values between the third electrical value and the fourth electrical value. The system 100 can then: generate a second axis container; and store a second axis direction and a second axis force magnitude of the first input in the second axis container.

Therefore, the system 100 can: generate a cursor event (i.e., 2-dimensional vector on a horizontal plane) based on the first axis container and the second axis container containing a horizontal direction and a horizontal magnitude of the first input; and modify a position of a cursor within a graphical user interface on a computing device based on the cursor event.

In another example, the system 100 can, at a first time, output a first cursor event to modify a position of a cursor within a graphical user interface on a computing device based on the direction of the input applied to the post 130. The system 100 can then, at a second time following the first time, read a second set of electrical values from the set of sense electrodes 118 following application of a second input on the post 130. Accordingly, based on the second set of electrical values, the system 100 can: interpret a fourth displacement of the first drive electrode 114 relative to the first subset of sense electrodes 119, in the set of sense electrodes 118, along the first axis; and interpret a fifth displacement of the first drive electrode 114 relative to the second subset of sense electrodes 120, in the set of sense electrodes 118, along the second axis. The system 100 can then: interpret a second direction—different from the first direction—of a second input applied to the post 130 based on the fourth displacement and the fifth displacement; and output a second cursor event to modify the position of the cursor within the graphical user interface on the computing device based on the second direction of the second input applied to the post 130.

6.2 Vertical Gestures

In one implementation, the system 100 can: detect vertical displacement of the first region 112 of the substrate 110—responsive to downward forces applied by a user to the post 130 arranged over the first region 112 of the substrate 110—along a vertical axis (e.g., z-height axis); interpret a force magnitude for a touch input applied to the post 130 based on this vertical displacement; and execute a standard click cycle in response to application of a force that exceeds a target force magnitude. In this implementation, the system 100 can: read a set of electrical values from the set sense electrodes facing the first drive electrode 14; calculate a sum of electrical values in the set of electrical values; and interpret the third displacement (e.g., downward displacement) of the first drive electrode 114 relative the set of sense electrodes 118 based on a deviation of the sum of electrical values from a baseline electrical value. The system 100 can then, based on the third displacement, interpret a downward force magnitude of the input applied on the post 130, such as based on deviations of a magnitude of a third displacement from a baseline magnitude.

In one example, during application of downward forces to the post 130, the first region 112 of the substrate 110 including the first drive electrode 114 yields vertically towards the second region 116 of the substrate 110 thereby uniformly affecting electrical values for each of the sense electrodes in the set of sense electrodes 118 arranged on the second region 116. The controller 160 can then: read electrical values from each sensor electrode in the set of sense electrodes 118; interpret a force magnitude of a touch input along the vertical axis based on uniform deviations of electrical values for each sensor electrode in the set of sense electrodes 118 from baseline uniform electrical values for each sensor electrode in the set of sense electrodes 118; and execute a click cycle in response to application of a force that exceeds a target force magnitude.

In another example, the controller 160 can execute a "standard click cycle" in response to application of a force that exceeds a first force magnitude and that remains less than a second force threshold (hereinafter a "standard click input"); executes a "deep click cycle") in response to application of a force that exceeds the second force threshold (hereinafter a "deep click input").

In this example, the controller 160 can output a left-click mouse control function (or left-click trackpad control function, as described below) in response to a standard click input and can output a right-click mouse control function in response to a deep click input. The system 100 can therefore detect inputs of different force magnitudes on the post 130 along the vertical axis, assign an input type to an input based on its magnitude, and output different control functions based on an input's assigned type.

6.3 Inclined Gestures

In one implementation, the system 100 can: detect inclined displacement of the first region 112 of the substrate 110 (i.e., displacement along the first axis, the second axis, and the vertical axis) responsive to simultaneous shear forces and downward forces applied by a user to the post 130 arranged over the first region 112 of the substrate 110; and transform these inclined displacements into different control functions for a computing device.

For example, during a scan cycle, the controller 160 can: read a first set of electrical values from the first subset of sense electrodes 119 on the second region 116 of the substrate 110 defining the first axis (e.g., x-horizontal axis) of the substrate 110; and read a second set of electrical values from the second subset of sense electrodes 120 on the second region 116 of the substrate 110 defining the second axis (e.g., y-horizontal axis) of the substrate no. The controller 160 can then subsequently: interpret a first magnitude and first direction of a first input along the first axis based on magnitudes of deviations of electrical values from first baseline electrical values across the first subset of sense electrodes 119; interpret a second magnitude and a second direction of the first input along the second axis based on magnitudes of deviations of electrical values from second baseline electrical values across the second subset of sense electrodes 120; and interpret a third force magnitude of the first input along the vertical axis based on magnitudes of non-uniform deviations of electrical values from third baseline electrical values across each sense electrodes in the first subset of sense electrodes 119 and the second subset of sense electrodes 120.

Therefore, the system 100 can then interpret total force magnitude based on: the first magnitude and first direction of the first input along the first axis; the second magnitude and the second direction of the first input along the second axis; and the third force magnitude of the first input along the vertical axis. Furthermore, the system 100 can assign an input type to the first input based on these magnitudes and direction, and output different control functions based on an input's assigned type.

In another example, at a first time and in response to the force magnitude exceeding a first threshold force magnitude, the system 100 can output a first click function of a cursor within a graphical user interface on a computing device based on the force magnitude of the input applied to the post 130. The system 100 can then, at a second time following the first time, read a second set of electrical values from the set of sense electrodes 118 following application of a second input on the post 130. Accordingly, based on the second set of electrical values, the system 100 can: interpret a fourth displacement of the first drive electrode 114 relative the first subset of sense electrodes 119, in the set of sense electrodes 118, along the first axis; interpret a fifth displacement of the first drive electrode 114 relative the second subset of sense electrodes 120, in the set of sense electrodes 118, along the second axis; and interpret a sixth displacement of the first drive electrode 114 relative the set of sense electrodes 118 along the normal axis. The system 100 can then: interpret a second force magnitude of the second input applied to the post 130 based on the fourth displacement, the fifth displacement, and the sixth displacement; and in response to the second force magnitude exceeding a second threshold force—greater than the first threshold force—output a second click function of the cursor within the graphical user interface on the computing device based on the second force magnitude of the second input applied to the post 130.

7. Calibration

In one implementation, the system 100 can execute a calibration routine in order to generate baseline gesture images (i.e., lateral gestures, vertical gestures, and inclined gestures) based on target selection forces applied to the post 130—arranged over the first region 112 of the substrate 110—for a computing device.

In one example, during the calibration routine, a probe is applied, at a target selection force, to a sequence of angular displacements (e.g., about the first axis and/or about the second axis) on the post 130. The controller 160 can then, at the system 100, capture a sequence of input images representing magnitudes of forces and directions detected on the post 130 during the calibration routine; fuse the sequence of input images into a response map representing magnitudes and directions of forces detected on the post 130 by the drive and sense electrodes across the substrate 110 responsive to application of the target selection force on the post 130 by the probe during the calibration routine; and generate a force compensation map defining threshold forces for detecting selections at the target selection force at a particular direction on the post 130 based on the response map.

Furthermore, during the calibration routine, the controller 160 can repeat these steps during application of the probe at a target downward force along the vertical axis to then define threshold downward forces for detecting selections of the input at the target downward force along the vertical axis of the post 130.

8. Haptics

In one implementation, the system 100 is integrated into a keyboard 150 of a computing device and includes: a set of keys 152; a chassis 154; a haptics actuator; and a controller 160 in order to serve haptic feedback at the system 100 responsive to detecting assigned input types.

For example, the set of keys 152 can be mounted over the chassis 154 and connected to a PCBA structure arranged within the chassis 154. System 100 can then be arranged within the chassis 154 and coupled (e.g., bonded) to the PCBA structure within the chassis 154 of the keyboard 150. In this example, the haptics actuator includes a multi-layer inductor: arranged within a set of layers of the PCBA structure; and located proximal the system 100 on the PCBA structure. The haptic actuator can further include a first magnetic element: arranged within the substrate 110; and facing the multi-layer inductor proximal the system 100. Therefore, the system 100 can: in response to detecting an assigned input type applied to the post 130 arranged over the first region 112 of the substrate 110, drive an oscillating voltage across the multi-layer inductor to induce alternating magnetic coupling between the multi-layer inductor—proximal the system 100—and the first magnetic element and oscillate the system 100 relative the chassis 154.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for a human-computer interface comprising:
a substrate comprising:
a first region comprising a first drive electrode defining an annular geometry concentric with a normal axis; and
a second region arranged opposite the first region and comprising a set of sense electrodes:
arranged radially about the normal axis; and
comprising:
a first subset of sense electrodes offset from the normal axis and arranged along a first axis orthogonal to the normal axis; and
a second subset of sense electrodes offset from the normal axis and arranged along a second axis orthogonal to the normal axis and the first axis;
a post arranged over the first region of the substrate;
a separator:
interposed between the first region of the substrate and the second region of the substrate;
configured to deflect along the first axis and the second axis responsive to shear forces applied to the post; and
configured to locally compress, along the normal axis, responsive to downward forces applied to the post; and
a controller configured to:
read a set of electrical values from the set of sense electrodes;
based on the set of electrical values:
interpret a first displacement of the first drive electrode relative to the first subset of sense electrodes, in the set of sense electrodes, along the first axis;
interpret a second displacement of the first drive electrode relative to the second subset of sense electrodes, in the set of sense electrodes, along the second axis; and
interpret a third displacement of the first drive electrode relative the set of sense electrodes along the normal axis;
interpret a direction of an input applied to the post based on the first displacement and the second displacement; and
interpret a force magnitude of the input based on the first displacement, the second displacement, and the third displacement.

2. The system of claim 1, wherein the controller is configured to interpret the force magnitude by:
interpreting a first force magnitude component of the input, parallel to the first axis, applied to the post based on the first displacement;
interpreting a second force magnitude component of the input, parallel to the second axis, applied to the post based on the second displacement; and
interpret a third force magnitude component of the input, parallel to the normal axis, applied to the post based on the third displacement.

3. The system of claim 1:
wherein the first subset of sense electrodes comprises:
a first sense electrode defining a first arc concentric with the normal axis and arranged in a first direction along the first axis; and
a second electrode defining a second arc concentric with the normal axis and arranged in a second direction, opposite the first direction, along the first axis; and
wherein the second subset of sense electrodes comprises:
a third sense electrode defining a third arc concentric with the normal axis and arranged in a third direction, orthogonal the first direction and the second direction, along the second axis;
a fourth sense electrode:
defining a fourth arc concentric with the normal axis and arranged in a fourth direction:
opposite the third direction; and
arranged orthogonal the first direction and the second direction; and
cooperating with the third sense electrode, the second sense electrode, and the first sense electrode to define an annular geometry for the set of sense electrodes concentric with the normal axis.

4. The system of claim 3:
wherein the controller is configured to interpret the first displacement by:
calculating a first difference between a first electrical value, in the set of electrical values, from the first sense electrode and a second electrical value, in the set of electrical values, from the second sense electrode; and interpreting the first displacement of the first drive electrode relative to the first subset of sense electrodes, in the set of sense electrodes, along the first axis based on the first difference; and wherein the controller is configured to interpret the second displacement by:
calculating a second difference between a third electrical value, in the set of electrical values, from the third sense electrode and a fourth electrical value, in the set of electrical values, from the fourth sense electrode; and
interpreting the second displacement of the first drive electrode relative to the second subset of sense electrodes, in the set of sense electrodes, along the second axis based on the second difference.

5. The system of claim 1, wherein the controller is configured to interpret the third displacement by:
calculating a sum of electrical values in the set of electrical values; and
interpreting the third displacement of the first drive electrode relative the set of sense electrodes based on a deviation of the sum of electrical values from a baseline electrical value.

6. The system of claim 1, wherein the separator comprises:
a first separator layer:
interposed between the first region and the second region of the substrate;
defining a cylindrical geometry concentric with the normal axis; and
characteristic of a first durometer; and
a second separator layer:
defining an annular geometry concentric with the normal axis;
arranged about the cylindrical geometry of the first separator layer interposed between the first region and the second region of the substrate;
characteristic of a second durometer less than the first durometer; and
cooperating with the first layer to:
deflect along the first axis and the second axis responsive to shear forces applied to the post; and
locally compress, along the normal axis, responsive to downward forces applied to the post.

7. The system of claim 1, wherein the separator comprises:
a first separator layer:
arranged over the first drive electrode on the first region of the substrate; and
characteristic of a first durometer;
a second separator layer:
arranged over the set of sense electrodes on the second region of the substrate opposite the first separator layer on the first region of the substrate; and
characteristic of the first durometer; and
a third separator layer:
interposed between the first separator layer and the second separator layer;
characteristic of a second durometer less than the first durometer; and
cooperating with the second separator layer and the second separator layer to:
deflect along the first axis and the second axis responsive to shear forces applied to the post; and
locally compress, along the normal axis, responsive to downward forces applied to the post.

8. The system of claim 1:
wherein the substrate comprises a unitary structure:
comprising:
a connecter defining:
a first side extending from the first region of the substrate; and
a second side extending from the second region of the substrate to form a bridge between the first region of the substrate and the second region of the substrate;
a tail extending from the second region of the substrate opposite the second side of the connector;
a set of traces arranged across the tail and the connector to couple to the first drive electrode and the set of sense electrodes; and
folded to locate the first region facing the second region; and
wherein the separator is interposed between the connector and the tail to separate the first region of the substrate and the second region of the substrate.

9. The system of claim 1:
wherein the post extends upwardly from a set of keys arranged on a chassis of a computing device; and
wherein the controller is configured to:
output the direction and the force magnitude of the input to a processor in the computing device; and
modify a position of a cursor within a graphical user interface on the computing device based on the direction and the force magnitude.

10. The system of claim 1, wherein the controller is configured to:
at a first time, output a first cursor event to modify a position of a cursor within a graphical user interface on a computing device based on the direction of the input applied to the post;
at a second time following the first time, reading a second set of electrical values from the set of sense electrodes;
based on the second set of electrical values:
interpret a fourth displacement of the first drive electrode relative to the first subset of sense electrodes, in the set of sense electrodes, along the first axis; and
interpret a fifth displacement of the first drive electrode relative to the second subset of sense electrodes, in the set of sense electrodes, along the second axis;
interpret a second direction, different from the first direction, of a second input applied to the post based on the fourth displacement and the fifth displacement; and
output a second cursor event, different from the first cursor event, to modify the position of the cursor within the graphical user interface on the computing device based on the second direction of the second input applied to the post.

11. The system of claim 1, wherein the controller is configured to:
at a first time, and in response to the force magnitude exceeding a first threshold force magnitude, output a first click function of a cursor within a graphical user interface on a computing device based on the force magnitude of the input applied to the post;
at a second time following the first time, read a second set of electrical values from the set of sense electrodes;
based on the second set of electrical values:
interpret a fourth displacement of the first drive electrode relative to the first subset of sense electrodes, in the set of sense electrodes, along the first axis;
interpret a fifth displacement of the first drive electrode relative to the second subset of sense electrodes, in the set of sense electrodes, along the second axis; and interpret a sixth displacement of the first drive electrode relative the set of sense electrodes along the normal axis;

interpret a second force magnitude of a second input applied to the post based on the fourth displacement, the fifth displacement, and the sixth displacement; and in response to the second force magnitude exceeding a second threshold force, greater than the first threshold force, output a second click function of the cursor within the graphical user interface on the computing device based on the second force magnitude of the second input applied to the post.

12. The system of claim 1:
wherein the first region of the substrate further comprises a second drive electrode:
defining a second annular geometry across the first region; and
concentrically aligned with the first drive electrode arranged on the first region; and
wherein the set of sense electrodes:
are arranged across the second region facing the first drive electrode and the second drive electrode; and
are concentrically aligned to the first drive electrode and the second drive electrode.

13. The system of claim 1:
wherein the substrate further comprises a second set of sense electrodes:
arranged radially about to the normal axis encircling the first set of sense electrodes arranged across the second region of the substrate; and
concentrically aligned to the first drive electrode on the first region of the substrate; and
wherein the controller is configured to:
read the set of electrical values from the first set of electrical values and the second set of electrical values; and
based on the first set of electrical values and the second set of electrical values:
interpret the first displacement of the first drive electrode relative to the first set of sense electrodes and the second set of sense electrodes along the first axis; and
interpret the second displacement of the first drive electrode relative to the first set of sense electrodes and the second set of sense electrodes along the second axis.

14. The system of claim 1, wherein the controller is configured to:
output a first cursor event to modify a position of a cursor within a graphical user interface on a computing device based on the direction of the input applied to the post; and
in response to the force magnitude exceeding a first threshold force magnitude, output a first click function of a cursor within a graphical user interface on a computing device based on the force magnitude of the input applied to the post.

15. The system of claim 1, wherein the first drive electrode spans a circular area, concentric with the normal axis, across the first region of the substrate and faces the set of sense electrodes arranged on the second region of the substrate.

16. A system for a human-computer interface comprising:
a substrate comprising:
a first region comprising a first drive electrode defining an annular geometry concentric with a normal axis; and
a second region arranged opposite the first region and comprising a set of sense electrodes:
arranged radially about the normal axis; and
comprising:
a first subset of sense electrodes offset from the normal axis and arranged along a first axis orthogonal to the normal axis; and
a second subset of sense electrodes offset from the normal axis and arranged along a second axis orthogonal to the normal axis and the first axis;
a post arranged over the first region of the substrate; and
a separator:
interposed between the first region of the substrate and the second region of the substrate;
configured to deflect along the first axis and the second axis responsive to shear forces applied to the post; and
configured to locally compress, along the normal axis, responsive to downward forces applied to the post.

17. The system of claim 16, further comprising a controller configured to:
read a set of electrical values from the set of sense electrodes;
based on the set of electrical values:
interpret a first displacement of the first drive electrode relative to the first subset of sense electrodes, in the set of sense electrodes, along the first axis;
interpret a second displacement of the first drive electrode relative to the second subset of sense electrodes, in the set of sense electrodes, along the second axis; and
interpret a third displacement of the first drive electrode relative the set of sense electrodes arranged along the normal axis;
interpret a direction of an input applied to the post based on the first displacement and the second displacement; and
interpret a force magnitude of the input based on the first displacement, the second displacement, and the third displacement.

18. The system of claim 16:
wherein the substrate comprises a unitary structure:
comprising:
a connecter defining:
a first side extending from the first region of the substrate; and
a second side extending from the second region of the substrate to form a bridge between the first region of the substrate and the second region of the substrate;
a tail extending from the second region of the substrate opposite the second side of the connector;
a set of traces arranged across the tail and the connector to couple to the first drive electrode and the set of sense electrodes; and
folded to locate the first region facing the second region; and
wherein the separator is interposed between the connector and the tail to separate the first region of the substrate and the second region of the substrate.

19. The system of claim 16, wherein the first drive electrode spans a circular area, concentric with the normal axis, across the first region of the substrate and faces the set of sense electrodes arranged on the second region of the substrate.

20. A system for a human-computer interface comprising:
a substrate comprising:
  a first region comprising a sense electrode defining an annular geometry concentric with a normal axis; and
  a second region arranged opposite the first region and comprising a set of drive electrodes arranged:
    radially about the normal axis;
    along a first axis orthogonal to the normal axis; and
    along a second axis orthogonal to the normal axis and the first axis;
a post arranged over the first region of the substrate; and
a controller configured to:
  read a set of electrical values from the sense electrode;
  based on the set of electrical values:
    interpret a first displacement of the sense electrode relative to the set of drive electrodes along the first axis; and
    interpret a second displacement of the sense electrode relative to the set of drive electrodes along the second axis; and
  interpret a direction of an input applied to the post based on the first displacement and the second displacement.

* * * * *